United States Patent
Shechter

(10) Patent No.: US 10,836,662 B2
(45) Date of Patent: Nov. 17, 2020

(54) PROCESS AND SYSTEM FOR WASTEWATER TREATMENT

(71) Applicant: FLUENCE WATER PRODUCTS AND INNOVATION LTD, Caesarea (IL)

(72) Inventor: Ronen-Itzhak Shechter, Kiryat Tivon (IL)

(73) Assignee: FLUENCE WATER PRODUCTS AND INNOVATION LTD, Caesarea (IL)

(*) Notice: Subject to any disclaimer, the term of this patent is extended or adjusted under 35 U.S.C. 154(b) by 0 days.

(21) Appl. No.: 16/344,864

(22) PCT Filed: Oct. 26, 2017

(86) PCT No.: PCT/IL2017/051174
§ 371 (c)(1),
(2) Date: Apr. 25, 2019

(87) PCT Pub. No.: WO2018/078629
PCT Pub. Date: May 3, 2018

(65) Prior Publication Data
US 2020/0048119 A1    Feb. 13, 2020

Related U.S. Application Data

(60) Provisional application No. 62/412,963, filed on Oct. 26, 2016.

(51) Int. Cl.
*C02F 3/00* (2006.01)
*C02F 3/28* (2006.01)
(Continued)

(52) U.S. Cl.
CPC ............... *C02F 3/005* (2013.01); *C02F 3/28* (2013.01); *H01M 8/16* (2013.01);
(Continued)

(58) Field of Classification Search
CPC .. C02F 3/005; C02F 3/28; C02F 2001/46133; C02F 2201/46135; C02F 2201/46145;
(Continued)

(56) References Cited

U.S. PATENT DOCUMENTS

2012/0100590 A1    4/2012  Tartakovsky et al.

FOREIGN PATENT DOCUMENTS

| CN | 102492506 A |   | 6/2012 |
| CN | 105601070 A | * | 5/2016 |

OTHER PUBLICATIONS

Machine-generated English translation of CN 102492506, generated on Mar. 31, 2020.*

(Continued)

*Primary Examiner* — Fred Prince
(74) *Attorney, Agent, or Firm* — Vorys, Sater, Seymour and Pease LLP; Anthony Venturino

(57) ABSTRACT

Provided is a wastewater treatment process including: (a) circulating wastewater including biodegradable organic material, between an anaerobic digester (AD) and at least one microbial electrolysis cell (MEC), the MEC including an anode and a cathode; (b) applying voltage on said anode and said cathode; and (c) discharging from said AD biogas with a methane fraction of above 70% v/v. Also provided is a biological wastewater treatment system including wastewater inlet, and (i) an anaerobic digester (AD) comprising biogas outlet, and effluent outlet; and (ii) at least one microbial electrolysis cell (MEC) including an anode and a cathode; said AD and said at least one MEC being in liquid communication through liquid circulation lines configured for at least circulating wastewater between said AD and said at least one MEC.

17 Claims, 4 Drawing Sheets

(51) Int. Cl.
*H01M 8/16* (2006.01)
*C02F 1/461* (2006.01)

(52) U.S. Cl.
CPC ............... *C02F 2001/46133* (2013.01); *C02F 2201/46135* (2013.01); *C02F 2201/46145* (2013.01); *C02F 2209/06* (2013.01); *C02F 2209/12* (2013.01); *C02F 2209/285* (2013.01); *C02F 2209/30* (2013.01)

(58) Field of Classification Search
CPC .............. C02F 2209/06; C02F 2209/12; C02F 2209/285; C02F 2209/30; C02F 11/04; C02F 2209/245; H01M 8/16; Y02E 50/343; Y02E 60/527
USPC ..... 210/601, 603, 615, 630, 748.16, 748.17, 210/748.18, 259, 614
See application file for complete search history.

(56) References Cited

OTHER PUBLICATIONS

Machine-generated English translation of CN 105601070, generated on Mar. 31, 2020.*
Bo et al., "A new upgraded biogas production process: Coupling microbial electrolysis cell and anaerobic digestion in single-chamber, barrel-shape stainless steel reactor", Electrochemistry Communications, vol. 45, pp. 67-70, (2014).

* cited by examiner

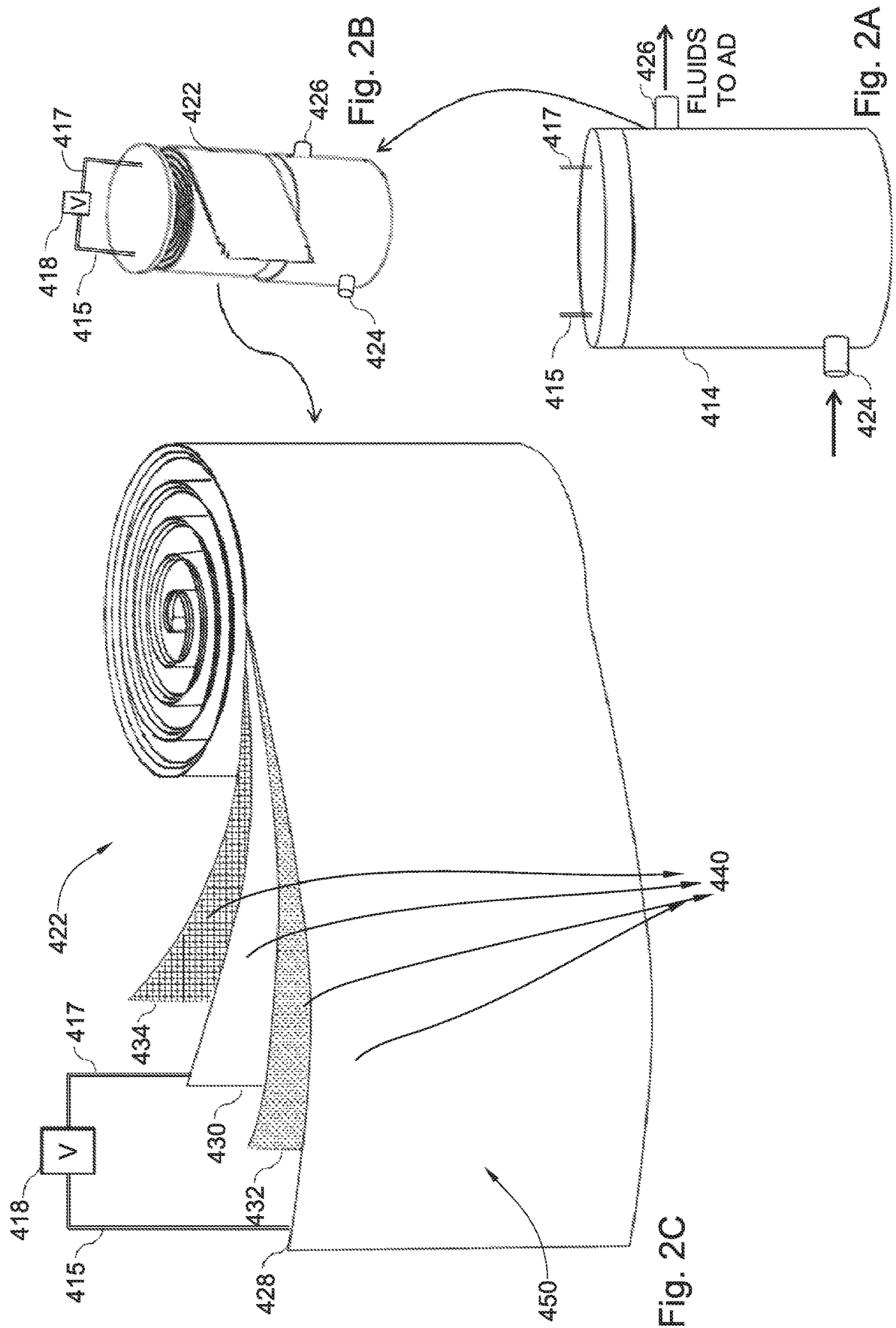

PROCESS AND SYSTEM FOR WASTEWATER TREATMENT

TECHNOLOGICAL FIELD

The present disclosure concerns a process and system for wastewater treatment and biogas production.

BACKGROUND ART

References considered to be relevant as background to the presently disclosed subject matter are listed below:
US 2012/0100590

Acknowledgement of the above references herein is not to be inferred as meaning that these are in any way relevant to the patentability of the presently disclosed subject matter.

BACKGROUND

Biogas can be produced during wastewater biodegradation. One technique involves anaerobic biodegradation of organic material within the wastewater, making use of an anaerobic digester (AD). During the operation of an AD a series of anaerobic biological processes take place that lead to the production of methane containing biogas.

However, biogas produced in ADs regularly contains a maximal fraction of 65-70% methane along with other components such as carbon dioxide (Wastewater Engineering: Treatment and Reuse. Metcalf & Eddy Inc., New York, N.Y.: McGraw-Hill). Therefore, it cannot be directly utilized as a renewable natural gas and typically undergoes costly chemical purification processes in order to remove non-methane gasses from the biogas, to thereby increase the methane fraction in the biogas.

A further technique makes use of electrolysis cells, where typically electrodes would be placed in an electrolyte solution and voltage would be applied to the electrodes to cause breakdown of the water or some of the electrolytes. In wastewater treatment, the electrolysis cell is a microbial electrolysis cells (MEC) where electrogenic bacteria, present at the anode, oxidize organic material using the anode as an electron acceptor, and thus provide part of the voltage to achieve the cathode half-cell reaction. Specifically in case of hydrogen generation at the cathode, protons are released to the solution from the anode half-cell oxidation of the organic material. Similar to AD, MECs operate in generally anaerobic conditions.

US patent application publication No. 2012/0100590 describes a microbially-assisted water electrolysis for improving biomethane production. Specifically described therein is a method of producing in a bioreactor, biogas richer in methane than before conducting the method, the method comprising: (a) electrolyzing water using anode and cathode electrodes in an aqueous medium at a voltage sufficient to electrolyze water without destroying microbial growth, the voltage being in a range of from 1.8 v to 12 v in the presence of electrochemically active anaerobic microorganisms growing on the cathode that biocatalyze production of hydrogen gas, with a volumetric power consumption in a range of from 0.03 wh/$l_R$ to 0.3 wh/$l_R$ and a current density of 0.01 a/$cm_E^2$ or lower; and, (b) contacting a species of hydrogenotrophic methanogenic microorganisms with hydrogen gas and carbon dioxide to produce methane.

GENERAL DESCRIPTION

Biogas is a fuel that can be utilized to produce either or both electricity and heat. The present disclosure aims at providing an improved process and system for producing such biogas from wastewater such that its methane content that is above 70% v/v out of the total volume of gas in the biogas.

The present disclosure thus provides, in accordance with a first of its aspects, a process for producing biogas containing methane, the process comprising circulating wastewater comprising biodegradable organic material, between an anaerobic digester (AD) and at least one microbial electrolysis cell (MEC) and discharging biogas from said AD, said biogas having a fraction of methane gas therein above 70% v/v. This discharged biogas is referred to at times by the term "methane-enriched biogas". The MEC typically comprises electrodes, i.e. an anode and a cathode onto which voltage is applied.

In the context of the present disclosure, a methane-enriched biogas is to be understood as encompassing biogas, e.g., gas produced by the fermentation of organic material in the wastewater, that contains an amount of methane that is at least 70% v/v out of the total volume of the biogas. In some embodiments, the methane-enriched biogas contains up to 95% methane gas.

Wastewater entering the circulation between the AD and MEC, contains biodegradable organic material. The term "wastewater" refers to water containing organic material and in the context of the present disclosure, collectively encompasses wastewater entering as well as the water circulating between the AD and MEC. The wastewater can be defined, at the different stages of the process, by the concentration of biodegradable organic material therein (usually expressed in milligrams per liter (mg/l)). For example, wastewater entering the process (untreated wastewater) may typically contain at minimum 1,000 mg/l of biodegradable organic material, but may contain up to even 100,000 mg/l biodegradable organic materials (most commonly it contains several thousands to several tens of thousands mg/ml). Further, for example, wastewater circulating between the AD and the MEC will contain lower concentrations than that entering the system and is referred to at times by the term "mixed liquor" (ML).

In the context of the present disclosure, where wastewater is concerned, the term "biodegradable organic material" or in short, "organic material" or "organic matter" or "BOD" is used to denote a mixture of organic compounds, including, small, medium and high molecular weight compounds Effluent water is the water discharged from the circulation and is referred to herein at times, by the term "treated water". The treated water may contain organic matter, yet typically at a much lower concentration than that within the circulating water. In some embodiments, the effluent is discharged with organic material content being below a predetermined level.

The AD and the MEC are in fluid communication such that wastewater is circulated between the AD and the MEC, for a sufficient time to obtain an elevated methane fraction in the biogas produced in the AD. In the AD biological degradation of the biodegradable organic material into volatile fatty acids takes place. Specifically, in the AD, the organic material undergoes breakdown into VFA, carbon dioxide ($CO_2$), methane and water, by microorganisms.

There are AD designs wherein solid-liquid separation of the biomass from the effluent is done internally, so sludge is retained longer than the water, and there are AD designs where separation is performed externally (this being more common when the sludge and water retention times are similar).

In general, four biochemical stages take place in the AD, hydrolysis, acidogenesis, acetogenesis and methanogenesis (P. Bajpai, Anaerobic Technology in Pulp and Paper Industry, CHAPTER 2: Basics of Anaerobic Digestion Process. Springer Briefs in Applied Sciences and Technology, DOI 10.1007/978-981-10-4130-3_).

The hydrolysis stage involves bacterial hydrolytic breakdown of the input organic material that includes insoluble organic polymers such as carbohydrates and make them available for acidogenic bacteria that convert the sugars and amino acids into carbon dioxide, hydrogen, ammonia and organic acids. In turn, the acetogenic bacteria present in the digester convert these resulting organic acids into volatile fatty acids (VFA, i.e. short chain fatty acids) along with additional ammonia, hydrogen, and carbon dioxide. Finally, methanogens convert these products to methane and carbon dioxide by methanogenic bacteria in the circulating water. The production of methane by the bacteria follows the reaction:

$$CO_2 + 4H_2 \rightarrow CH_4 + 2H_2O$$

It is noted that the stream of wastewater contains volatile fatty acids (VFA) as further discussed below that are created in the AD. These are the organic matter being oxidized in the MEC. The loading rate of organic material per unit volume of the AD is called "organic loading rate" OLR. A higher OLR creates more VFA, yet VFA reduces the pH (acidify) and that may inhibit the methanogenesis process within the MEC. The MEC removes VFA and thus stabilizes the operation of the AD and prevents inhibition of methane generation. This is in addition to the improvement of the biogas quality.

The volatile fatty acids are short chain fatty acids, i.e. those having a carbohydrate chain length of 1-6. Among others, the VFA include, without being limited thereto, acetic acid, propionic acid, butyric acid, valeric acid, which are known to be important for methane formation.

The VFA containing wastewater from the AD system is continuously fed into the MEC, where microorganisms are attached to the anode in the form of a biofilm to produce carbon dioxide, electrons and protons from the breakdown of the VFA. At the cathode of the MEC protons from the water are reduced to hydrogen. In addition, methanogenic bacteria, present in the circulating water in suspended form, produce methane in the MEC from the carbon dioxide and hydrogen dissolved in the water.

By the additional production of methane in the MEC, while consuming dissolved carbon dioxide, the fraction of methane over carbon dioxide in the biogas generated by the AD increases as compared to the fraction thereof when only employing AD.

Many different AD systems are commercially available and can be utilized in the process and system disclosed herein. These include, for example continuously stirred tank reactor (CSTR) type reactors provided by Fluence and Aenergia, or Up flow anaerobic sludge blanket technology (UASB) type reactors such as provide by Paques or Biothane.

The methane fraction in the biogas can be, in accordance with some embodiments, optimized by control of process performance. In some embodiments, control comprises decreasing or increasing the circulation ratio per wastewater influent.

In the context of the present disclosure, when referring to "circulation ratio" it is to be understood as meaning the flow rate circulated between the AD and MEC per flowrate of incoming untreated wastewater.

In some other embodiments, optimization can be obtained by controlling the voltage applied onto the electrodes within the at least one MEC.

Controlling of circulation ratio and/or applied voltage allows to maintain at least one of (i) methane content of the biogas (ii) biodegradable organic material concentration, e.g. effluent BOD concentration; (iii) pH of circulating water.

The circulation ratio and/or applied voltage, may independently be dictated by one or more process parameters. In the context of the present disclosure, when referring to a process parameter it is to be understood as referring to a measurable physical, chemical or biological parameter of the process that can be sensed by dedicated sensors as further discussed below. Without being limited thereto, process parameters may include any one or combination of hydrogen concentration, organic material concentration, VFA concentration, biomass or suspended solids concentration, methane fraction in the biogas, carbon dioxide concentration in the biogas, water temperature, flow rate, pH value in the wastewater.

In some more specific embodiments, the process parameter includes one or combination of any one of hydrogen concentration in the circulating wastewater, pH value in the circulating wastewater, volatile fatty acids concentration in the circulating wastewater, carbon dioxide concentration in the biogas, and methane concentration in the biogas.

In some embodiments, the circulation ratio and/or applied voltage are dictated by the hydrogen produced so as to maintain the latter at a saturation concentration in the circulating wastewater, i.e. the circulating water flows at a rate or the voltage is applied in an amount that satisfies the required hydrogen production rate for the entire process. The value of hydrogen saturation concentration depends, inter alia, on process pressure and temperature, and can be found in various textbooks such as Perry's Chemical Engineers' Handbook (McGraw-Hill) or Handbook of Chemistry and Physics (CRC). Thus, when the concentration of hydrogen is below a required concentration, circulation ratio may be decreased and when hydrogen concentration is at saturation, circulation may be increased.

The circulation ratio and/or applied voltage may also affect methane fraction in the discharged biogas. An increase in methane fraction in the biogas is proportional to the circulation ratio or applied voltage, and inherently is in correlation with the concentration of biodegradable organic material (e.g. the circulation ratio increases with the increase in concentration of biodegradable organic material in the wastewater, for example in terms of biochemical oxygen demand (BOD)). In other words, for higher methane fraction, at any given conditions, a higher circulation ratio and/or higher voltage is required and vice versa, in order to reduce methane fraction, the circulation ratio and/or voltage should be reduced. Equally, increase in the circulation ratio and/or voltage will cause increase in methane fraction and vice versa, decrease in circulation ratio and/or voltage will reduce methane fraction in the biogas.

Thus, in some embodiments, the required circulation ratio and/or applied voltage depends on concentration of biodegradable organic material within the water and thus the process disclosed herein includes determining concentration of biodegradable organic material within the circulating water, and in some embodiments, concentration of VFA in the circulating wastewater. According to the concentration of such organic material, the circulation ratio can be manipulated, e.g. increased or decreased or maintained, so as to, respectively, increase, decrease or maintain methane production in the AD.

The concentration of biodegradable organic material and specifically VFA can be determined based on pH measurements. Generally, accumulation of VFA causes decrease in pH and thus pH level is a reflection of VFA concentration. Thus, monitoring pH may dictate the required circulation ratio or applied voltage so as to increase or decrease, according to need, the concentration of circulation organic material and/or VFA and thus, respectively, increase or decrease hydrogen production.

In a preferred embodiment, the pH is maintained at a level between 6.0 and 8.0. In order to maintain said pH range in the AD, the operating conditions are altered, e.g. by increasing or decreasing the applied voltage and the circulation ratio in response to a decrease or increase in the pH.

Yet, in some additional or alternative embodiments, the circulation ratio and/or applied voltage is determined and controlled based on biogas composition analysis. For example, using a gas analyzer for either methane or carbon dioxide concentration in biogas discharged from the AD, the circulation ratio and/or voltage can be increased (e.g. when concentration of carbon dioxide is above a pre-determined threshold or concentration of methane is below a predetermined threshold, e.g. 70% v/v) or decreased or maintained (e.g. when concentration of methane satisfied a pre-determined level).

The control of the circulation ratio can be achieved by means of a dedicated circulation pump, e.g. connected to a variable frequency drive (VFD), or a thermos-syphon, as further described below.

The methane fraction in the biogas can be further optimized by the control of additional parameters of the process disclosed herein.

As noted above, in yet some further or alternative embodiments, the methane content can be increased by controlling voltage applied to the MEC. It is desired to maintain the applied voltage to the electrodes of the MEC at a sufficient value to produce a current corresponding to the required hydrogen production. The voltage and circulation rate are typically increased or decreased together in order to, respectively, increase or decrease hydrogen production, and further, respectively, to increase or decrease methane content in the thus produced biogas.

In some embodiments, the voltage is maintained at a lower value than the voltage required for water electrolysis (water splitting). In conventional electrolysis cell, the minimal required applied voltage for water splitting is theoretically 1.23V, and in practice 1.8V-2.0V. In MEC as used in the present disclosure, with acetate as a substrate (electrical performance of acetate as an electrolyte is substantially similar to other VFA) and electrogenic biofilm development on the anode, the theoretical required applied voltage in order to produce hydrogen at the cathode side is 0.114V. However, in order to avoid over-potential, 0.25V is the minimal applied voltage required in practice [B. E. Logan, *Microbial Fuel Cells*, John Wiley & Sons, Inc. (2007)].

Thus, in accordance with an embodiment of the present disclosure, the voltage is may be controlled to be maintained any voltage within the range of 0.25V to 1.5V, but preferably in the range 0.4V to 1.2V. The applied voltage is changed in order to change the hydrogen production capacity, primarily in response to process performance as indicated by sensors or measurements of parameters such as biogas composition and circulating wastewater pH.

The required voltage for a given current in a given MEC is influenced by electrode material, and specifically by the catalytic properties of the electrode material and the surface structure such as porosity or roughness that increase the surface area for reaction and function similar to a catalyst.

It has been found that, at times, feeding/enriching the circulating wastewater with a portion of the produced biogas also increased methane fraction in the discharged biogas. Biogas containing carbon dioxide is re-introduced into circulation and is converted to methane. The biogas can also be obtained from other sources (such as an external gas reservoir) and it would typically include at least carbon dioxide.

In some embodiments, the re-introduction of biogas is by means of sparging, (e.g. through diffusers, as discussed below, into at least one of the AD and MEC. In some embodiments, the diffusion is by bubbling so as to cause turbulence and thus mixing of the water, in addition to enrichment with the biogas components. The re-introduction of biogas can be continuous or periodically, e.g. upon need of mixing and/or enrichment of carbon dioxide.

In one embodiment, the process disclosed herein is a continuous process. Accordingly, the process comprises continuously (i) introducing wastewater including biodegradable organic material into the AD and/or MEC; (ii) collecting treated water; (iii) collecting biogas.

The present disclosure also provides a wastewater treatment system for producing methane-rich biogas. The system disclosed herein comprises wastewater inlet, and (i) an anaerobic digester (AD) comprising biogas outlet, and effluent (treated water) discharge outlet; and (ii) at least one microbial electrolysis cell (MEC) comprising electrodes (anode and cathode); wherein the AD and at least one MEC are in fluid communication through a liquid circulation line configured for circulating wastewater between the AD and the MEC.

In some embodiments, the system comprises two or more MEC units arranged in parallel to treat wastewater in circulation with a single AD.

Many different AD systems are commercially available and can be utilized in the process and system disclosed herein. These include, for example Upflow Anaerobic Sludge Blanket (UASB) type reactors by technology providers such as Paques or Biothane, or Completely Stirred Tank Reactor (CSTR) type provided by Anaergia or Fluence.

In some embodiments, the AD comprises wastewater inlet for receiving wastewater from a wastewater reservoir into said AD; in yet some other embodiments, the untreated wastewater is provided at the MEC and from the MEC, the wastewater is communicated into the AD and further between the MEC and AD.

The AD and/or MEC may comprise, in accordance with some embodiments, one or more gas diffusers. The purpose of the gas diffuser(s) may be two-fold, namely, to cause turbulence within the wastewater, and thus mixing of the wastewater within the AD and/or MEC, and to enrich the wastewater with the diffused gas. Accordingly, and in line with some embodiments, the one or more gas diffusers are configured to receive at least a portion of the biogas discharged from the AD and diffuse the biogas into the wastewater. As such, the wastewater is enriched with carbon dioxide contained in the biogas.

In some embodiments, the process comprises operating said gas diffuser(s) to continuously or intermittently introducing gas into the water treatment space (e.g. into the AD or MEC tank). In some embodiments, the introduced gas is in a form of discrete bubbles.

Optionally in addition or alternatively, mechanical mixing, such as agitators can be employed inside AD and/or in MEC in order to provide sufficient turbulence to homogenize the wastewater.

As noted above, the efficiency of the process can be affected by on one or more process parameters. For example, if hydrogen concentration in the circulating water and/or the methane fraction in the biogas is below the desired threshold, e.g. below 70% v/v, the control unit may be cause an increase in the circulation ratio and/or in the applied voltage, thereby increasing methane content in the biogas. Thus, there is a need to periodically or continuously monitor such process parameters. To this end, and in accordance with some embodiments, the system comprises one or more sensors for sensing respectively, one or more of the process parameters.

In some additional or other embodiments, the system comprises one or more sensors for sensing hydrogen concentration in the circulating water.

In some additional or other embodiments, the system comprises one or more sensors for sensing organic material concentration and/or VFA concentration.

In some embodiments, the system comprises a pH sensor for sensing pH of the circulating wastewater. As noted above, pH level may be indicative of organic matter/VFA content.

In some additional or other embodiments, the system comprises one or more sensors for sensing microbial concentration.

In some additional or other embodiments, the system comprises one or more sensors for sensing gas composition e.g. methane concentration and/or carbon dioxide concentration.

In some additional or other embodiments, the system comprises one or more temperature sensors for sensing water temperature.

The one or more sensors described above may independently be disposed within the AD, within the MEC, along the circulating pipe line, or at any other suitable location in the system in a manner permitting it to be in contact with the wastewater or discharged biogas.

One process parameter includes temperature of the circulating water. To this end, and in accordance with some embodiments, the system may comprise at least one heat exchanger for heating the circulating wastewater to a desired temperature. As noted above, there may be a benefit in heating the wastewater in at least the AD to temperatures of between 35° C. and 60° C., at times, around 38° C.±5° C. or around 55° C.±5° C. The heat exchanger may be coupled to the temperature sensor so as to control the temperature to be at the desired level. In some embodiments, the heat exchanges is positioned along the circulating line, i.e. not part of the AD or MEC.

In some embodiments, the system comprises a pump along said liquid circulation line for causing circulation of wastewater between said AD and said MEC.

In some embodiments, the system comprises a control unit including, inter alia, input/output utilities, a memory utility and an analyzer. The control unit is thus configured and operable to receive input data indicative of one or more process parameters and analyze the same to produce an output comprising operational data/instruction for the system's components (e.g. AD and/or MEC, pump) as further described below. The control unit may be at a remote location, i.e. with wireless connection to the system's components (e.g. AD, MEC, pump, heat exchange), or it may be wire connected to the bioreactor's components.

In some embodiments, the control unit is coupled to a pump or a thermo-syphon or the like for altering the circulation ratio based on the one or more sensed and outputted (measured) process parameters.

In some embodiments, the control unit is coupled to a variable frequency drive that is connected to the system's pump (typically located along the circulation line), so as to adjust the circulation ratio, as needed.

In some other embodiments, the control unit is coupled to a thermo-syphon unit. The principle of a thermo-syphon unit is that cold water has a higher specific density than warm water, and so being heavier will sink down. Therefore, when using a thermo-syphon, e.g. between a MEC and an AD, water heated at the MEC system will rise (due to temperature differences) and reaches the AD system positioned above the MEC. In some embodiments, heating capacity of the thermo-syphon is increased, e.g. by means of control valve on the produced steam or hot water inlet to the heat exchanger of the thermo-syphon so as to increase circulation ratio.

The control unit allows the automatic operation of the system by measuring, and analyzing one or more process parameters and outputting operational instructions that dictate circulation ratio and/or applied voltage within the system. As such, the control unit is configured to receive data relating to the one or more process parameters and actuate the system's components (thereby manipulate the process) based on the received data.

In some embodiments, the control unit is coupled to one or more of the sensors for sensing the said one or more (or combination) of the process parameters.

In accordance with some embodiments, the electrodes in the MEC is comprised of spirally rolled, multi-layer assembly, including, essentially parallel to each other, an anode layer, a cathode layer, an electrically insulating layer/element between the anode and the cathode and a flow spacer layer/element separated from the electrically insulating layer/element by the cathode. The anode and cathode, according to this embodiment, may be electrically connected across an external electrical load.

In some embodiments, the layers of the electrodes, insulating element and spacer element are rolled or winded (folded) to form a convoluted horizontal path configuration, through which wastewater flows. In this embodiment, the layers of the electrode are rolled in a concentric spiral configuration. Yet, other configurations are equally applicable. In some alternative configurations, the electrodes' layers are rolled in an elliptical spiral configuration. Yet in some other alternative configurations, the electrodes' layers are winded in an accordion ("back and forth snaking" or "zigzag") configuration.

The electrodes comprise an electrically conductive material.

In some embodiments, the electrode material in the one or more MEC is carbon based, e.g. it comprises any one or combination of a woven or non-woven carbon cloth (fabric), carbon paper, carbon/graphite felt, carbon veil, graphite granules and graphite brushes. In some embodiments, the carbon based electrodes comprise metal current collectors.

In some other embodiments, the electrode material in the one or more MEC is metal based, e.g. it comprises or is selected from metal screen, metal mesh and conductive metal-coated plastics. In some embodiments, the metal based electrodes are selected from stainless steel, titanium or a nickel alloy in a form selected from metal screen, and metal mesh.

In some embodiments, the electrically conductive material of at least one of the electrodes is selected from copper alloy or aluminum alloy coated with a conductive plastic.

The layers in the multi-layer assembly may be flexible or rigid. In some embodiments, at least some of the layers, or parts thereof are flexible or made of a flexible material.

The electrically insulating element is, in accordance with some embodiments, is a non-woven polymeric fabric. In some embodiments, the electrically insulating element is made of an ion permeable insulating material.

The flow spacer element is configured to permit water fluid passageway between the two electrodes. To this end, the flow spacer element is a water permeable layer made of an electrically insulating material.

The flow spacer element is aimed to provide a space between the electrodes, and can have the general form of a three dimensional grid or net.

In some other embodiments, the flow spacer element can be in a form of a sheet comprising a multiplicity of discrete three dimensional elements. In some embodiments, these discrete elements are in the form of protrusions e.g. dimples, corrugations, hook like protrusions or any combination of same.

The flow spacer element may be referred to at times as an hydraulic spacer element that is a water permeable element made of an electrically insulating material.

In some embodiments, the protrusions extend in only one direction from the sheet from which they extend (one sided protrusions) and in some other embodiments, the protrusion extend from the sheet in two opposite directions (double sided protrusions).

In some embodiments, the flow spacer element is a combination of any of the above spacer configurations. For example, the flow spacer element can comprise a net like structure that is laminated to a dimpled sheet, etc.

The electrically insulating element and the flow spacer element may be of the same or different material. In some embodiments, the electrically insulating spacer element and the flow spacer element are each, independently made, from a water durable polymeric material. Non-limiting examples of polymeric materials include high density polyethylene, low density polyethylene, polyethylene terephthalate (PET), polypropylene, polyamide.

In the MEC, biofilm is grown on the anode. Thus, in accordance with some embodiments, the anode comprises a wastewater facing side that has a water impermeable, gas permeable electrically conductive membrane and the membrane is configured to support biofilm growth thereon or is surface treated or comprises material that supports biofilm growth thereon. In some embodiments, the electrically conductive material supports biofilm production and in some other embodiments, the electrically conductive material is surface treated or comprises material that supports biofilm growth thereon.

As to the cathode, it typically comprises a conductive material and/or comprise a catalyst for hydrogen reduction. The catalyst, such as a non-precious metal catalyst or a heat treated carbon based catalyst doped with nitrogen or a metal, may be applied onto the cathode in order to reduce the activation energy of water reduction, thus reduce the required applied voltage.

In some embodiments, the electrodes are as described in WO2010/049936 and WO2012/081001, the content of which is incorporated herein in its entirety by reference.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A-2C is a simplified pictorial illustration of a microbial electrolysis cell (MEC) in accordance with an embodiment of the present disclosure, with FIG. 2B and FIG. 2C representing the electrode element in this MEC, the latter in partially exploded view.

DETAILED DESCRIPTION OF NON-LIMITING EMBODIMENTS

Figure 1A:
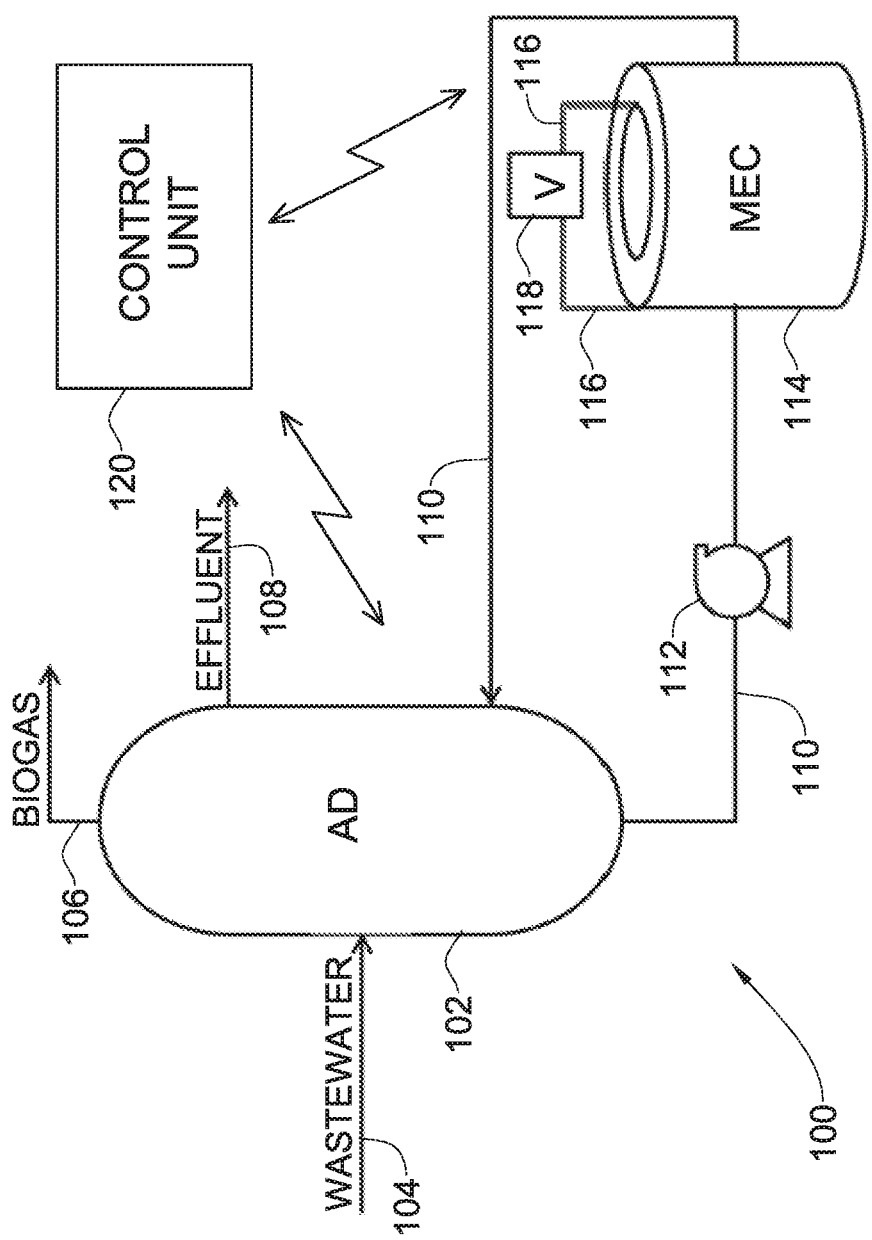
FIG. 1A-1C are simplified process block diagrams illustrating the operation of biogas production systems constructed and operative in accordance with alternative embodiments of the present disclosure.

Reference is now made to FIG. 1A, which is a simplified process block diagram illustrating the construction and operation of a bioreactor system 100 for wastewater treatment and biogas production, according to an embodiment of the present disclosure.

Wastewater from a wastewater source (e.g. wastewater reservoir) flows into bioreactor system 100 into anaerobic digester (AD) 102 via a dedicated wastewater inlet indicated by arrow 104. AD is comprised of an enclosed tank (not illustrated), which provides anaerobic conditions. In AD 102, biodegradation of organic material takes place. Complex organic material breaks down to volatile fatty acids (VFA), and biogas. Biogas is collected via biogas outlet indicated by arrow 106, typically located at a top end of an AD tank. Treated water is discharged from the system via an effluent outlet illustrated by arrow 108.

Wastewater in AD tank 102 is communicated to microbial electrolysis cell (MEC) tank 114 forming part of bioreactor system 100, via circulation line 110 driven by a pump 112, and circulated between AD 102 and MEC 114.

Voltage from power source 118 is applied through wires 116 on electrodes (not shown) submerged inside MEC tank 114. In MEC 114 biodegradation of VFA (i.e. electrogenic hydrogenesis) and production of hydrogen, takes place.

Hydrogen is dissolved in the wastewater within the MEC tank 114 and is then recirculated together with the wastewater to AD 102 via circulation line 110 where it is converted to methane by the bacteria suspended in the wastewater within AD tank 102. Gases segregated from the water are discharged via biogas outlet indicated by arrow 106.

Untreated wastewater can continuously or intermittently be fed into the bioreactor system 100, and respectively biogas 106 and effluent 108 can be continuously or intermittently discharged from the bioreactor system.

The circulation of wastewater within the bioreactor system cause turbulence and thereby mixing of the wastewater within at least AD 102 and/or MEC 114. Optionally additional mechanical mixers, such as agitators (not shown) can be employed inside AD 102 and/or MEC 114 in order to provide additional turbulence to homogenize the wastewater.

In accordance with some embodiments, mixing may also be achieved by the use of dedicated gas diffusers within AD 102 and/or in MEC 114 (not shown). Accordingly, bioreactor system 100 comprises at least one, but typically an array of more than one gas diffuser disposed within at least one of said AD and MEC (not shown). The gas can be from any source and would typically contain at least carbon dioxide. According to some embodiments, the at least one gas diffuser is in fluid communication with a biogas source (not shown) containing biogas produced by AD 102, and is configured to receive biogas from said biogas source and diffuse the same into said at least one of said AD and MEC.

In one embodiment, a portion of discharged biogas 106 is collected in the overhead or in a dedicated storage (not shown) and is sparged through mixing diffusers (not shown) placed at the bottom of AD 102 and/or in MEC 114. Such diffusers release bubbles of gas into the wastewater in the water treatment space within AD 102 and/or in MEC 114 and thereby provide turbulence. In some embodiments, bubbling of biogas into the wastewater can enrich the circulating water with carbon dioxide to thereby favorably shift to the methanogenic reaction, thus reducing content of carbon dioxide from the biogas.

A portion of the produced biogas can also be employed for heating the water. For example, AD 102 may be configured to operate at a mesophilic temperature of around 38° C. or at a thermophilic temperature of around 55° C. Heat can optionally be supplied to the water from burning a portion of the biogas collected via steam boiler, using a heat exchanger or other known means.

The bioreactor system 100 may also comprise one or more sensors (not shown). The one or more sensors may be utilized for sensing, during operation of bioreactor system 100, at least one process parameter. As described above, there may be various process parameters that can be determined during the operation of the bioreactor system. These include, for example, hydrogen concentration—the sensing of which may be for the purpose of maintaining the hydrogen concentration at its saturation level; biodegradable organic material concentration, and VFA concentration—the sensing of which may be to ensure sufficient substrate for the bacteria within the AD or MEC; circulating wastewater temperature—the sensing of which is, inter alia, to ensure optimal temperature for bacterial function; carbon dioxide and/or methane concentration—the sensing of which may be to verify maximal efficiency/yield of process; and microbial concentration—the sensing of which may be to ensure sufficient bacterial degradation; pH value—the sensing of which indicated organic matter/VFA concentration.

During operation, increasing or decreasing the circulation ratio and/or applied voltage, affects one or more of the process parameters, with the aim of increasing methane content within the produced biogas, and vis-versa, one or more process parameters may dictate flow rate of the system and thereby the circulation rate.

In some embodiments, the process parameters taken into account for the calculation of circulation rate and/or applied voltage include the concentration of biodegradable organic material in the circulating wastewater and the desired methane fraction discharged out of the biogas. The concentration of the organic material and the fraction of the methane gas in the biogas are sensed and monitored such that their concentration is within a desired range. For example, the concentration of biodegradable organic material may be monitored to be at least 1,000 mg/l and at times several thousands to tens of several thousands of mg/l and/or the fraction of the methane gas in the biogas may be maintained to be above 70% in volume per measured volume unit of biogas.

In an exemplary embodiment, such as that illustrated in FIG. 1A, wastewater 104 introduced into AD 102 contains biodegradable organic material at a concentration of about 5,000 mg/l. In order to increase methane fraction in biogas produced above 70% (the maximum fraction of methane produced by AD alone), to 81% methane in the biogas produced in the bioreactor system 100, a circulation ratio of 38:1 circulation per influent is required.

In a further exemplary embodiment, assuming wastewater contains biodegradable organic compounds concentration of 3,000 mg/l. In order to increase methane fraction of biogas produced, from 70%, which is regularly produced in conventional AD (when operated without circulation through MEC), to 82% methane of the biogas produced in the system, a ratio of 23:1 circulation per influent is required.

Generally, the circulation ratio is determined according to the wastewater flow rate required to dissolve the generated hydrogen capacity at the operating pressure and temperature, wherein the generated hydrogen generation capacity in terms of mass per unit time are as required to maintain process performance in terms of any of produces biogas composition and/or circulating wastewater pH.

Figure 1B:
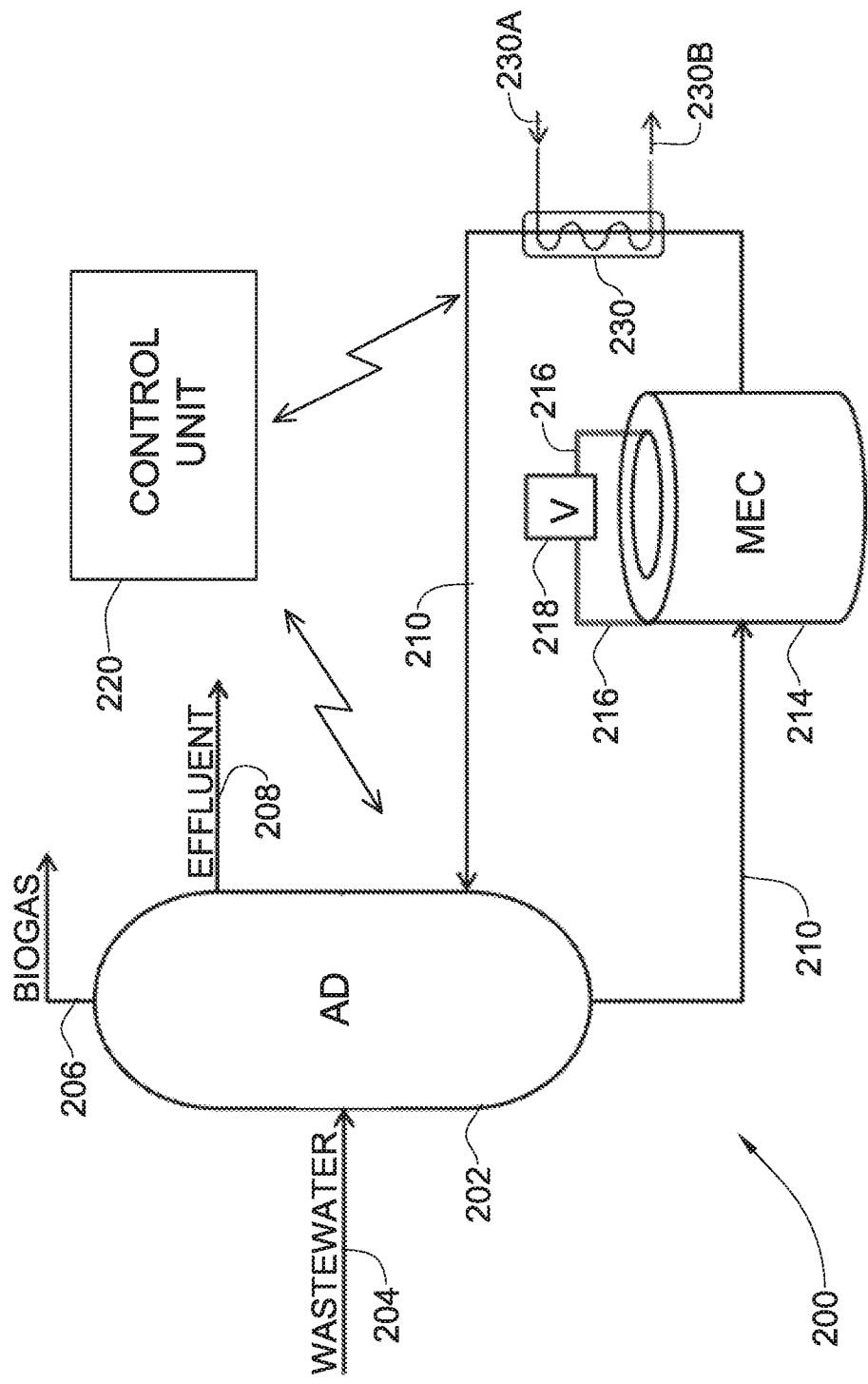

Circulation can either be driven by a pump 112, or by a heat exchanger, such as shown in FIG. 1B (as further discussed below).

Bioreactor system 100 also comprises a control unit 120 including input/output utilities, a memory module and an analyzer, for receiving input data, analyzing the same and outputting operational data/instructions for causing a change in the operation of the bioreactor system to thereby affect, typically improve process parameters. For example, the control unit 120 may cause a change in the flow rate of the wastewater through the bioreactor's elements, applied voltage, heating, sensing by dedicated sensors, pressure, changing the circulation ratio etc.

Reference is now made to FIG. 1B, which is a simplified process diagram illustrating an alternative bioreactor system 200 producing methane enriched biogas, the system being constructed and operative in accordance with another embodiment of the present disclosure.

For simplicity, same reference numerals used in FIG. 1A are used to represent identical elements in FIG. 1B, shifted by 100 and the reader is referred to the above descriptions for explanation of the structure and function of such elements.

Similar to bioreactor system 100, in bioreactor system 200, wastewater flows into anaerobic digester (AD) 202 via wastewater inlet indicated by arrow 204. Biogas is collected via biogas outlet indicated by arrow 206, located at the top of the AD tank 202. Treated water is discharged from the system via effluent outlet indicated by arrow 208. Wastewater is circulated via circulation line 210 through microbial electrolysis cell (MEC) tank 214 and back to AD 202.

In addition, voltage from power source 218 is applied through wires 216 on electrodes (not shown) submerged inside MEC tank 214.

In bioreactor system 200 circulation is driven by heat exchanger 230, which may be in a form of a thermo-syphon. According to one embodiment, heat exchanger 230 may receive heat from a steam boiler employing a portion of the biogas discharged from AD 202. In one alternative embodiment, biogas is used to generate electricity via a gas generator (not illustrated). According to this alternative embodiment, heat exchanger 230 receives heat from exhaust gas emitted from the generator, during a process known as combined heat and power or cogeneration (CHP). The directions of heat entrance to heat exchanger 230 and heat release from heat exchanger 230 are indicated respectively by arrows 230A and 230B.

Figure 1C:
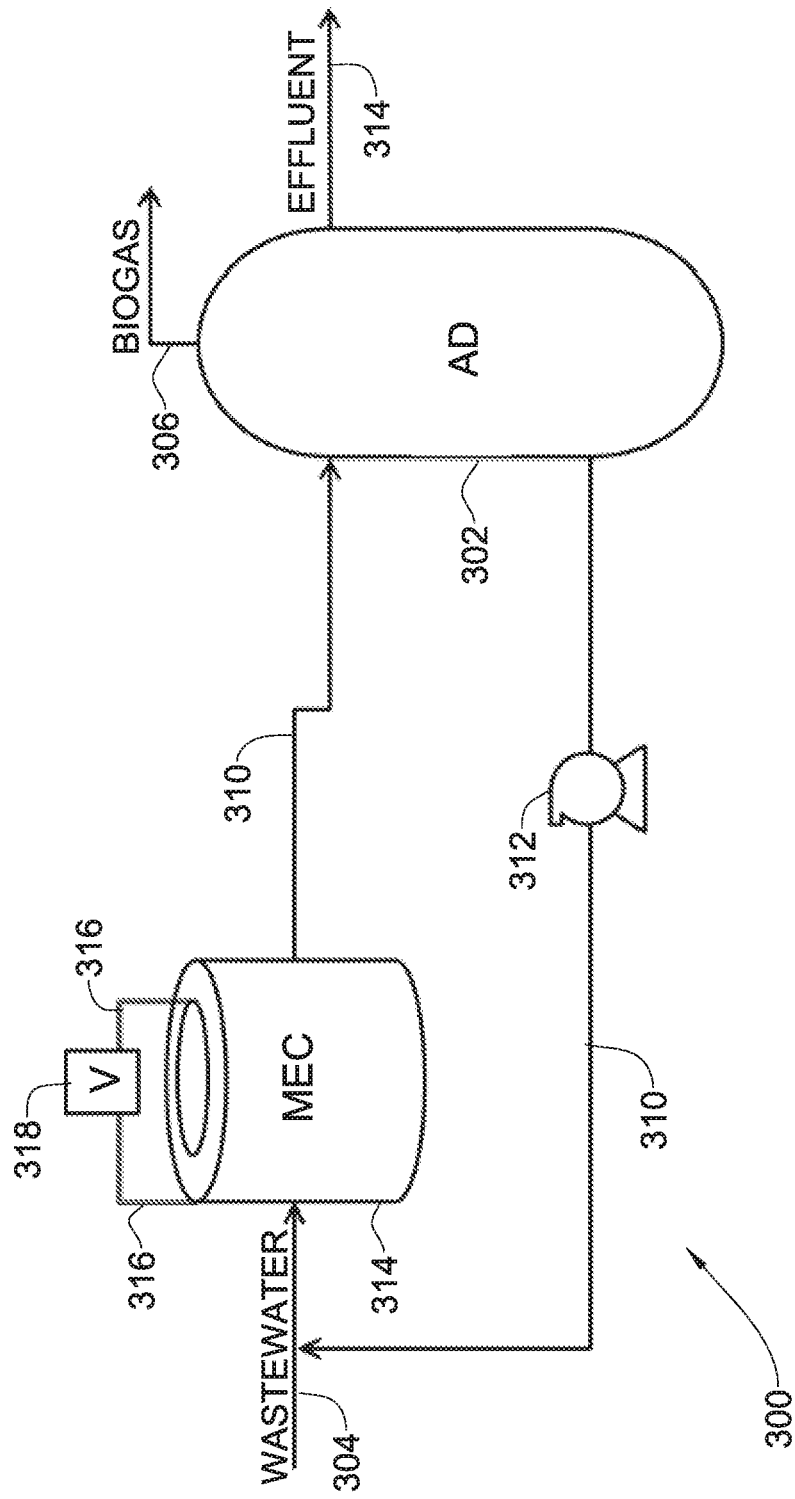

Reference is now made to FIG. 1C, which is a simplified process diagram illustrating another alternative bioreactor system 300 for producing methane enriched biogas, constructed and operated in accordance with another embodiment of the present disclosure.

For simplicity, same reference numerals used in FIG. 1A are used to represent identical elements in FIG. 1C, shifted by 200, and the reader is referred to the above descriptions for explanation of the structure and function of such elements.

In bioreactor system 300 untreated wastewater is introduced into the circulation via microbial electrolysis cell (MEC) 314 through a wastewater inlet indicated by arrow 304.

Fluids from MEC 314 flow to anaerobic digester (AD) 302 and biogas is collected via biogas outlet located at the top of the AD tank outlet indicated by arrow 306. Treated water is discharged from AD 302 via effluent outlet indicated by arrow 308. Wastewater is circulated via circulation line 310 back to inlet 304 of MEC 314 and gases segregated from the water are discharged via biogas outlet indicated by arrow 106.

Reference is now made to FIGS. 2A-2C, which are simplified illustrations showing the structure of a microbial electrolysis cell (MEC) in accordance with one embodiment of the present disclosure.

For simplicity, same reference numerals used in FIG. 1A are used to represent identical elements in FIGS. 2A-2C, shifted by 400 and the reader is referred to the above descriptions for explanation of the structure and function of such elements.

FIG. 2A is a simplified schematic illustration of a microbial electrolysis cell (MEC) 414 including liquid inlet 424 for receiving circulating water from the AD, and liquid outlet 426 for communicating the circulating water back to the AD, and electrical connectors 415 and 417 for connection to power source 418 (shown in FIG. 2B).

FIG. 2B provides a cutaway illustration of the MEC of FIG. 2A. Specifically shown is a spirally wound configuration of an electrode 422 within a MEC tank according to an embodiment of the present disclosure. Also illustrated in FIG. 2B are the liquid inlet 424, liquid outlet 426, voltage source 418 and the connections thereto 415 and 417.

A partial exploded view of the electrode 422 of FIG. 2B in illustrated in FIG. 2C, including an assembly of layers spirally arranged. In the multi-layer assembly, electrical connectors 415 and 417, connect, anode 428 and cathode 430, respectively, to the positive and negative poles of voltage source 418.

Electrodes spiral assembly 440 includes an anode 428, a cathode 430, electrically insulating element 432 between said anode 428 and said cathode 430, and flow spacer element 434 rolled together to a spirally wound multiple layer assembly 440. Anode 428 and cathode 430 are connected to positive and negative poles respectively of voltage source 418 through at least one anode connection wire 415 and at least one cathode connection wire 417.

Anode 428 is carbon based, namely, it comprises any one or combination of a woven or non-woven carbon cloth (fabric), carbon paper, carbon/graphite felt, carbon veil, graphite granules and graphite brushes.

Further, anode 428 comprises a wastewater facing side 450 that has a water impermeable, gas permeable electrically conductive membrane and the membrane is configured to support biofilm growth thereon or is surface treated or comprises material that supports biofilm growth thereon.

Anode 428 may equally be metal based, e.g. it comprises or is selected from metal screen, metal mesh and conductive metal-coated plastics.

Cathode 430 may similarly be carbon or metal based, this being independent from the material from which anode 428 is made.

In between anode 428 and cathode 430 there is positioned an electrically insulating element 432. In some embodiments, insulating element 432 is made of an ion permeable insulating material, to facilitate ionic current. Such ion permeable insulating material.

Further provided in electrode assembly 440 is a flow spacer element 434, illustrated as a net. The flow spacer element is typically a water permeable layer made of an electrically insulating material, to allow a path for the water flowing within the MEC. The shape and dimensions of flow spacer element 434 define that water passageway between the cathode and the facing/neighboring anode. In some other embodiments, the flow spacer element can be in a form of a sheet comprising protrusions e.g. dimples, corrugations, hook like protrusions or any combination of same and the dimension of the protrusion dictate the dimension of the passageway.

The layers in the multi-layer assembly 440 may be independent from one another flexible or rigid. In some embodiments, at least some of the layers, or parts thereof are flexible or made of a flexible material.

During the operation of the bioreactor system, an electrogenic biofilm develops on anode 428 due to a voltage applied onto the electrodes, anaerobic conditions and available carbon source. Biofilm bacteria on anode 428 oxidize VFA to carbon dioxide, protons (H+) and electrons (e−).

During the operation of the system, at cathode 430 protons are reduced to hydrogen which is released to the water.

The invention claimed is:

1. A wastewater treatment process comprising
circulating wastewater comprising biodegradable organic material, between an anaerobic digester (AD) and at least one microbial electrolysis cell (MEC), the MEC comprising an anode and a cathode;
applying voltage on said anode and said cathode; and
discharging from said AD biogas with a methane fraction of above 70% v/v;
sensing at least one process parameter, said process parameter being selected from hydrogen concentration in the circulating wastewater, pH value in the circulating wastewater, volatile fatty acids concentration in the circulating wastewater, carbon dioxide concentration in the biogas, and methane concentration in the biogas and combinations of same; and
controlling circulation flow rate and/or voltage applied onto said anode and said cathode of the MEC based on one or more of the sensed process parameters.

2. The process of claim 1, comprising controlling circulation ratio between said AD and said at least one MEC to maintain at least one of (i) hydrogen saturation concentration in said circulating wastewater, and (ii) methane concentration of more than 70% v/v in said discharged biogas.

3. The process of claim 1, comprising controlling the voltage applied onto said anode and said cathode to maintain at least one of (i) methane concentration of more than 70% v/v in said biogas and (ii) a pH value in the range of 6.0-8.0 in said circulating wastewater.

4. The process of claim 1, comprising controlling applied voltage onto said MEC and circulation ratio of said wastewater according to any one of (i) methane concentration in the discharged biogas and (ii) pH value in the range of 6.0-8.0 in said circulating wastewater.

5. The process of claim 1, comprising diffusing gas into at least one of said AD and said at least one MEC.

6. The process of claim 5, wherein said gas is biogas discharged from said AD.

7. The process of claim 1, comprising controlling voltage applied to said MEC to be in a range of 0.4V to 1.2V.

8. The process of claim 1, being a continuous process.

9. A biological wastewater treatment system comprising wastewater inlet, and (i) an anaerobic digester (AD) comprising biogas outlet, and effluent outlet and optionally a wastewater inlet for receiving wastewater into said AD; (ii) at least one microbial electrolysis cell (MEC) comprising an anode and a cathode; said AD and said at least one MEC being in liquid communication through liquid circulation lines configured for at least circulating wastewater between said AD and said at least one MEC; and (iii) a control unit for controlling at least one of (i) circulation ratio of wastewater during operation (ii) voltage applied onto said at least one anode and at least one cathode.

10. The biological wastewater treatment system of claim 9, wherein said at least one MEC comprises wastewater inlet for receiving wastewater circulating from said AD into said at least one MEC and an outlet for returning wastewater into said AD and optionally at least one gas diffuser disposed within at least one of said AD and said at least one MEC.

11. The biological wastewater treatment system of claim 9, wherein said at least one anode and at least one cathode are spirally wound carbon cloth electrodes separated by an electrically insulating element and a flow spacer element.

12. The biological wastewater treatment system of claim 9, comprising at least one sensor for sensing, during operation of said system, at least one process parameter, said at least one process parameter being selected from: hydrogen concentration in the circulating wastewater, VFA concentration in the circulating wastewater, methane concentration in the biogas, and pH value in the circulating wastewater.

13. The biological wastewater treatment system of claim 9, comprising a pump along said liquid circulation line for causing circulation of wastewater between said AD and said MEC.

14. The biological wastewater treatment system of claim 9, wherein said MEC comprises a spirally rolled assembly of layers, each layer comprising (i) an anode, (ii) a cathode, (iii) an electrically insulating element between the anode and the cathode and (iv) at least one flow spacer element, preferably hydraulic spacer element, said anode and cathode being electrically connected across an external electrical load.

15. The biological wastewater treatment system of claim 9, wherein said anode and said cathode comprise electrically conductive material, wherein the electrically conductive material supports biofilm growth thereon or is surface treated or comprises material that supports biofilm growth thereon.

16. The biological wastewater treatment system of claim 9, wherein said cathode comprises at least one of (i) an electrically conductive material, and (ii) a catalyst for hydrogen reduction.

17. The biological wastewater treatment system of claim 11, wherein said flow spacer element is water permeable element made of an electrically insulating material.

* * * * *